(12) United States Patent
Cady

(10) Patent No.: US 12,231,449 B2
(45) Date of Patent: Feb. 18, 2025

(54) PROACTIVELY TAKING ACTION RESPONSIVE TO EVENTS WITHIN A CLUSTER BASED ON A RANGE OF NORMAL BEHAVIOR LEARNED FOR VARIOUS USER ROLES

(71) Applicant: NetApp, Inc., San Jose, CA (US)

(72) Inventor: Tyler W. Cady, Denver, CO (US)

(73) Assignee: NetApp, Inc., San Jose, CA (US)

( * ) Notice: Subject to any disclaimer, the term of this patent is extended or adjusted under 35 U.S.C. 154(b) by 323 days.

(21) Appl. No.: 17/727,538

(22) Filed: Apr. 22, 2022

(65) Prior Publication Data

US 2023/0344845 A1 Oct. 26, 2023

(51) Int. Cl.
- *H04L 9/40* (2022.01)
- *G06F 9/54* (2006.01)
- *G06N 20/20* (2019.01)
- *H04L 41/16* (2022.01)

(52) U.S. Cl.
CPC .......... *H04L 63/1425* (2013.01); *G06F 9/547* (2013.01); *G06N 20/20* (2019.01); *H04L 41/16* (2013.01)

(58) Field of Classification Search
CPC .. G06F 9/46; G06F 9/54; G06F 9/547; G06N 20/20; H04L 41/16; H04L 63/14; H04L 63/1408; H04L 63/1425
See application file for complete search history.

(56) References Cited

U.S. PATENT DOCUMENTS

| | | | |
|---|---|---|---|
| 11,436,054 B1 | 9/2022 | Zad Tootaghaj et al. | |
| 2019/0129821 A1 | 5/2019 | Lee et al. | |
| 2020/0236123 A1 | 7/2020 | Kessel et al. | |
| 2021/0019143 A1 | 1/2021 | Landman | |
| 2021/0194853 A1* | 6/2021 | Xiao | H04L 43/028 |
| 2021/0318898 A1* | 10/2021 | Mitra | G06F 9/547 |
| 2021/0344719 A1* | 11/2021 | Ober | G06F 8/61 |
| 2022/0247769 A1* | 8/2022 | Erlingsson | H04L 67/535 |

(Continued)

OTHER PUBLICATIONS

Balestra J., et al., "How to Monitor Kubernetes Audit Logs," Datadog, 2020, pp. 1-11. URL: https://www.datadoghq.com/blog/monitor-kubernetes-audit-logs/.

(Continued)

*Primary Examiner* — D'arcy Winston Straub

(74) *Attorney, Agent, or Firm* — Jaffery Watson Hamilton & DeSanctis LLP

(57) ABSTRACT

Systems and methods are provided for learning normal behavior for user roles of an application running within a cluster of container orchestration platform and based thereon proactively taking action responsive to suspicious events. According to one embodiment, an event data stream is created by an API server of the cluster. The data for each event includes information regarding a request made to an API exposed by the API server with which the event is associated and a user of the application by which the event was initiated. The data is augmented with a role associated with the user and an anomaly threshold for the role. Normal behavior is learned by an ML algorithm of respective user roles by processing the augmented data. When an anomaly score associated with a particular event is output by the ML algorithm that exceeds the anomaly threshold, a predefined or configurable action is triggered.

20 Claims, 8 Drawing Sheets

(56) References Cited

U.S. PATENT DOCUMENTS

2022/0382593 A1* 12/2022 Tootaghaj ............ G06F 9/45558
2023/0104368 A1* 4/2023 Miriyala ............... G06F 9/5077
726/1

OTHER PUBLICATIONS

Bartos M.D., et al., "RRCF: Implementation of the Robust Random Cut Forest Algorithm for Anomaly Detection on Streams," The Journal of Open Source Software, 2019, vol. 4(35), 1336, pp. 1-4.
Guha S., et al., "Robust Random Cut Forest Based Anomaly Detection On Streams," Proceedings of the 33rd International Conference on Machine, 2016, vol. 48, pp. 1-10.
Naor G., "Using Machine Learning and Kubernetes Logs to Automate Security Threat Detection," Container Journal, 2021, pp. 1-5. URL: https://containerjournal.com/topics/container-security/using-machine-learning-and-kubernetes-logs-to-automate-security-threat-detection/.

* cited by examiner

```
apiVersion: audit.k8s.io/v1
kind: Policy
omitStages:                                          ─── 505
  - "RequestReceived"
rules:
  - level: RequestResponse                           ─── 510
    resources:
    - group: ""
      resources: ["pods"]
  - level: Metadata                                  ─── 515
    resources:
    - group: ""
      resources: ["pods/log", "pods/status"]
  - level: None                                      ─── 520
    resources:
    - group: ""
      resources: ["configmaps"]
      resourceNames: ["controller-config"]
  - level: None                                      ─── 525
    users: ["system:kube-proxy"]
    verbs: ["watch"]
    resources:
    - group: "" # core API group
      resources: ["endpoints", "services"]
```

```
  - level: RequestResponse                           ─── 530
    resources:
    - group: ""
      resources: ["deployments"]
  - level: Metadata                                  ─── 535
    resources:
    - group: ""
      resources: ["services"]
  - level: Request                                   ─── 540
    resources:
    - group: "" # core API group
      resources: ["configmaps"]
      namespaces: ["kube-system"]
  - level: Metadata                                  ─── 545
    resources:
    - group: "" # core API group
      resources: ["secrets", "configmaps"]
  - level: Request                                   ─── 550
    resources:
    - group: ""
    - group: "extensions"
  - level: Metadata                                  ─── 555
    omitStages:
    - "RequestReceived"
```

*FIG. 5*

PROACTIVELY TAKING ACTION RESPONSIVE TO EVENTS WITHIN A CLUSTER BASED ON A RANGE OF NORMAL BEHAVIOR LEARNED FOR VARIOUS USER ROLES

BACKGROUND

Field

Various embodiments of the present disclosure generally relate to network security and container orchestration platform cluster audit logs. In particular, some embodiments relate to a machine-learning (ML) based approach that increases confidence in taking proactive action responsive to events within a Kubernetes cluster by learning a range of normal behavior for various user roles associated with an application running in the Kubernetes cluster based on data from a Kubernetes application programming interface (API) server audit log augmented with various external data (e.g., user roles, anomaly thresholds, and/or additional derived features).

Description of the Related Art

Kubernetes (K8s) supports a number of audit logs, including the K8s API server audit log that records, among other things, requests to the K8s API. The K8s API server audit log (which is disabled by default) can be selectively configured based on an audit policy that defines rules about what events should be recorded and what level of detail the records should include. When enabled, the audit log captures every successful or unsuccessful API server call, thereby providing visibility into all events happening inside the K8s cluster and purportedly allowing skilled cluster administrators to determine what happened, when it happened, who initiated it, on what did it happen, where it observed, from where it was initiated, and to where it was going.

SUMMARY

Systems and methods are described for learning normal behavior for various user roles associated with an application running within a cluster of container orchestration platform and based thereon proactively taking action responsive to events observed within the cluster. According to one embodiment, an API server of the cluster is caused to log data for each event of a set of events within the cluster. The data includes information regarding a request made to an API exposed by the API server with which the event is associated and a user of multiple users associated with the application by which the event was initiated. The data is augmented with information indicative of a role of multiple user roles associated with the user and an anomaly threshold specified for the role. Normal behavior is learned by an ML algorithm of respective roles of the user roles by processing the augmented data. Responsive to processing of the augmented data for a particular event of the set of events, an anomaly score associated with the particular event is determined by the ML algorithm that is indicative of a degree of deviation from the normal behavior of the role. Based on a comparison between the anomaly score and the anomaly threshold specified for the role a predefined or configurable action is triggered.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5 is an example of an audit log policy file in accordance with an embodiment of the present disclosure.

DETAILED DESCRIPTION

Figure 1:
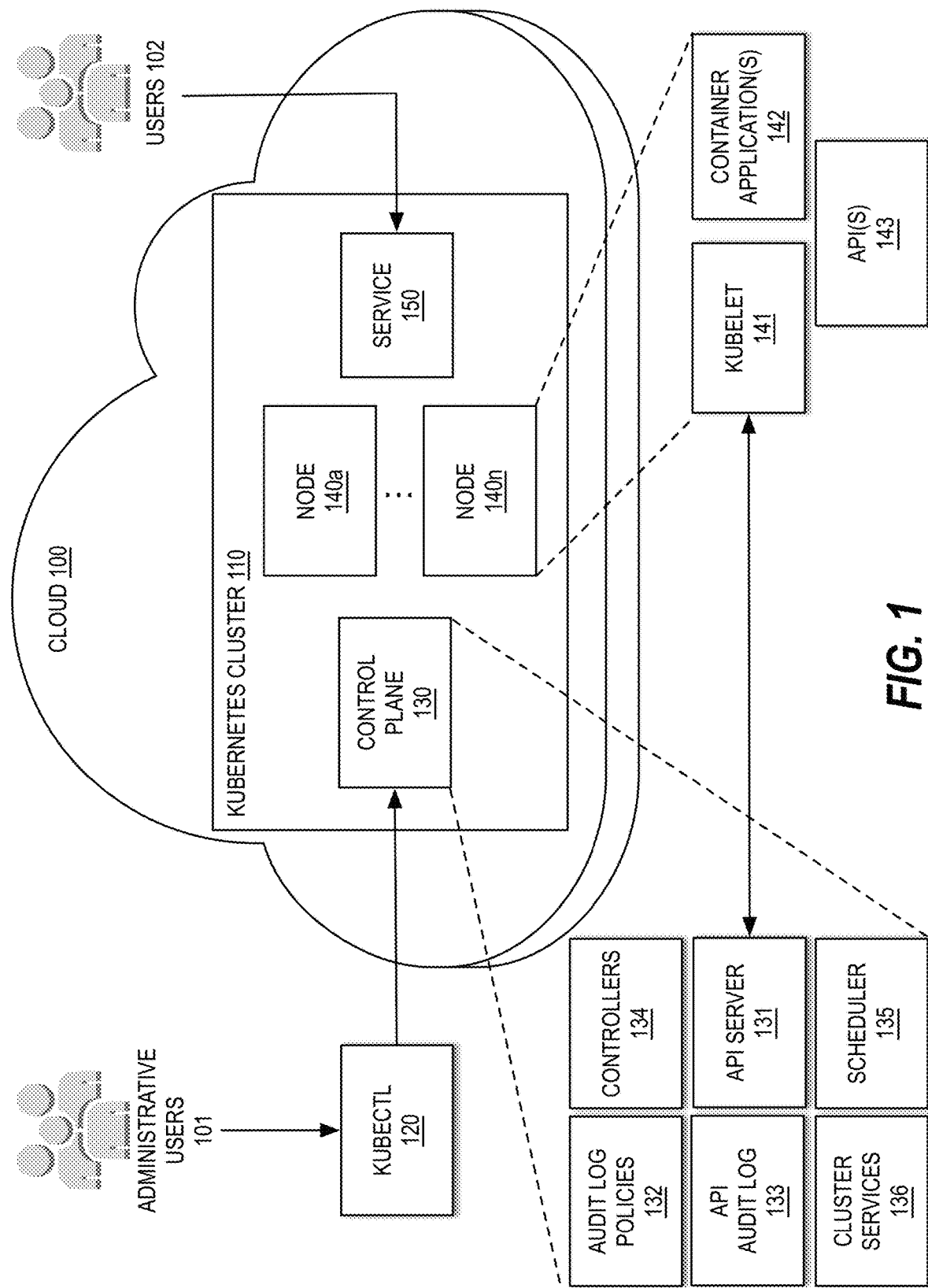
FIG. 1 is a block diagram conceptually illustrating various interactions with and among components of an exemplary operating environment in which various embodiments may be implemented.

Systems and methods are described for learning normal behavior for various user roles associated with an application running within a cluster of container orchestration platform and based thereon proactively taking action responsive to events observed within the cluster. As noted above, K8s provides an API server audit log. Various products/services purport to facilitate troubleshooting, debugging, security threat detection, and alerting by monitoring the K8s API server log. Such products/services are based on the use of simple static policies (e.g., including predefined and/or user-defined policies) to trigger alerts when a violation occurs. For example, threshold-based monitoring, may be used to generate alerts when API events, or combinations of events, rise above a specified threshold. Such approaches are easily bypassed and represent an exhausting source of false positives. These approaches also fail to address unknown threats or vulnerabilities.

Various examples described herein relate generally to modelling roles of users, detecting and acting on abnormal user behavior, and more specifically to addressing scenarios involving malicious or negligent insiders (e.g., misuse of credentials) and/or stolen credentials (e.g., phishing campaigns and shared credentials). Embodiments described herein seek to improve the technological process of anomaly detection, including reducing false positives and addressing unknown threats and vulnerabilities. Due to the reduction in false positives, more confidence may be placed in suspicious activity detection so as to more aggressively take proactive action beyond simple alerting and extending to temporary revocation of user permissions to access the cluster and/or the application running within the cluster, logging the user out and prompting the user via an out-of-band communication channel to change their credentials, and/or denying access to various systems and/or components (e.g., blocking API accesses, such as authentication requests and/or data access requests). With respect to the granularity of modeling, various examples, do so at the role level rather than at the user level in order to achieve more appropriate modeling of general behavior (e.g., independent of user-level idiosyncrasies) and also avoid various difficulties of user-level monitoring/modeling, for example, in the context of a large organizations with many users accessing a large cluster.

According to one embodiment, an API server of a container orchestration platform (e.g., one of the numerous K8s distributions, including OpenShift, Rancher, Amazon EKS, Google Kubernetes Engine (GKE), Microsoft Azure Kubernetes Service (AKS), Digital Ocean Kubernetes, lightweight Kubernetes (K3s), etc.) cluster is caused to log data for each event (e.g., API server requests and associated events, including deployment changes, service changes, pod changes, changes to pod configuration or configuration of system components (e.g., via K8s ConfigMap changes), and/or secret changes) of a set of events within the cluster. The data includes information regarding an API method exposed by the API server with which the event is associated and a user of a multiple users associated with the application by which the event was initiated. The data is augmented with information indicative of a role of a multiple user roles associated with the user and an anomaly threshold specified for the role. Normal behavior is learned by an ML algorithm of respective roles of the user roles by processing the augmented data. Responsive to processing of the augmented data for a particular event of the set of events, an anomaly score associated with the particular event is determined by the ML algorithm that is indicative of a degree of deviation from the normal behavior of the role. Based on a comparison between the anomaly score and the anomaly threshold specified for the role a predefined or configurable action is triggered.

For brevity and for purposes of providing concrete examples various illustrations and use cases may be described herein with reference to K8s; however, it is to be understood that the methodologies described herein are equally applicable to the various other K8s distributions and other container orchestration platforms more generally.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein an "event" broadly and generally refers to a request to an API of a cluster of container orchestration platform or an associated change in state of the cluster. Non-limiting examples of events include requests to the API, for example, in the form of representational state transfer (REST) operations (e.g., the hypertext transfer protocol (HTTP) GET, POST, PUT, and, or DELETE operations used to implement create, read, update, and delete (CRUD) operations for REST API resources (e.g., the underlying K8s resources)), "audit events," deployment changes, service changes, pod changes, changes to pod configuration or configuration of system components (e.g., via K8s ConfigMap changes), and/or secret changes. In K8s, each request to the K8s API may have a number of associated stages, including a RequestReceived stage, a ResponseStarted stage, a ResponseComplete stage, and a Panic stage. During execution/handling of a given request an audit event may be generated at each stage. As explained further below, audit events may then be pre-processed according to a certain rule or rule set of an audit log policy and written to a backend. The policy determines what, if any event data, is recorded and the backends persist event data in the form of audit records. The current backend implementations for K8s include logs files and webhooks.

As used herein a "user role" or simply a "role" broadly and generally refer to a permission group to which a user is assigned that defines the privileges or access that the user of an application or a system has within the application or system. For example, rather than assigning individual permissions directly to each user, permissions may be grouped into roles (e.g., owner, admin, editor, contributor, viewer) and such permissions may be indirectly associated with users by virtue of the role to which they are assigned. As users operating in different roles may exhibit different behaviors, embodiments described herein may learn a range of normal behavior at the granularity of the roles defined by the application or system at issue rather than at the user level.

Example Operating Environment

FIG. 1 is a block diagram conceptually illustrating various interactions with and among components of an exemplary operating environment in which various embodiments may be implemented. In the context of the present example, a cloud 100 (e.g., a public or private cloud) is shown hosting a cluster (e.g., K8s cluster 110, representing a non-limiting example of a cluster of a container orchestration platform). The K8s cluster 110 includes a control plane 130, multiple worker nodes (e.g., nodes 140a-n), and a service 150.

In the context of K8s, the control plane 130 manages the worker nodes and the pods (not shown) of the cluster, makes global decisions about the cluster (e.g., regarding scheduling), and detects and responds to cluster events. Control plane 130 is shown including an API server 131, audit log policies 132, an API audit log 133 (e.g., a file containing the recorded event data that may be persisted to a file system on external storage via a logging backend), controllers 134, a scheduler 135, and cluster services 136 (e.g., the cluster autoscaler, kube-state-metrics, coreDNS, etc.).

The API server 131 exposes the K8s API, which provides users (e.g., administrative users 101) with the ability to query and manipulate the state of API objects in K8s (e.g., Pods, Namespaces, ConfigMaps, and Events) via a K8s command-line tool (e.g., kubectl), which may be used to, among other things, deploy applications and inspect and manage cluster resources. As described further below, the API server 131 may generate log data (e.g., audit records) for different API groups (e.g., networking, events, authentication, apps, core, and the like) each having their own resources (e.g., network policies, events, tokens, deployments, configmaps, resource quotas, secrets, and the like). The log data contains a chronological list of all requests made to the API server 131 (e.g., from applications running within the cluster as a result of interactions by users (e.g., users 102) with the service 150 via kubectl 120, from the controllers 134, from the scheduler 135, from the cluster services 135, or from the API server 131 itself).

The audit log policies 132 may represent a set of rules, for example, contained in a policy file that specify what events are to be logged and the type or amount of data that is to be logged. A non-limiting example of a policy file is described below with reference to FIG. 5.

The controllers 134 may represent control loops that watch the state of the cluster and make or request changes when needed. Non-limiting examples of controllers that currently ship with K8s include a replication controller, an endpoints controller, a namespace controller, and a service accounts controller.

The scheduler 135 is a control plane process that may be responsible for assigning pods to worker nodes. The scheduler 135 typically determines which worker nodes are valid placements for each pod in the scheduling queue according to constraints and available resources and then ranks the valid nodes and binds the pod to a suitable node from among the ranked valid nodes.

Node 140n, which may be representative of nodes 140a-n, may be a virtual or physical machine depending on the cluster, and is shown including kubelet 141, container application(s) 142, and APIs 143. Kubelet 141 represents an agent that runs on each node in the cluster that may self-register with the control plane 130. Kubelet 141 may be responsible for communications between the control plane 130 and the nodes 140a-n where the actual workloads (e.g., one or more microservices across which the functionality of the container application(s) 142 are distributed) run within respective pods. The APIs 143 may represent REST APIs exposed by the container application(s) 142.

According to one embodiment, a container application of container application(s) 142 may represent a software defined storage (SDS) solution that offers a scalable, resilient platform with K8s-native shared file access for other of the container application(s) 142 or for other applications running within the same or a different cluster of the K8s ecosystem or another virtualization environment (e.g., a VMware ecosystem). In one embodiment, in order to facilitate suspicious activity detection, the API(s) 143 of the container application may individually log or otherwise record or retain (separately and independently of the API audit log 133) data associated with API calls. As described further below with reference to FIG. 2, multiple data sources (e.g., API audit log 133 and the data logged by API(s) 143) may be combined during a feature extraction stage to facilitate continuous learning and anomaly detection by an ML algorithm.

In the context of K8s, service 150 represents an abstract way to expose an application (e.g., one of container application(s) 142), for example, running as a collection of microservices within a set of pods, as a network service to other services or to end users (e.g., users 102). The service 150 may correspond to a "monitored application" (e.g., one of container application(s) 142) for which suspicious activity detection is being performed as described further below either by a separate application (not shown) of container application(s) 140 or as an embedded security solution within the same application.

According to one embodiment, in batches, in near real-time, or in real-time, as events are observed by the API server 131 and/or logged to the API audit log 133, depending upon the particular auditing backend used (e.g., logs files versus webhooks to HTTP callbacks) and/or as events are observed by API(s) 143 of the monitored application and/or logged, for example, internally and/or to a separate file, a feature extraction stage may be performed followed by a continuous learning and anomaly detection stage. A non-limiting example, of various functional units, including modules or routines that may be involved in performing certain processes or functions, of the feature extraction stage are described below with reference to FIG. 2. A non-limiting example, of various functional units, including modules or routines that may be involved in performing certain processes or functions, of the continuous learning and anomaly detection stage are described below with reference to FIG. 3.

Example Feature Extraction Stage

Figure 2:
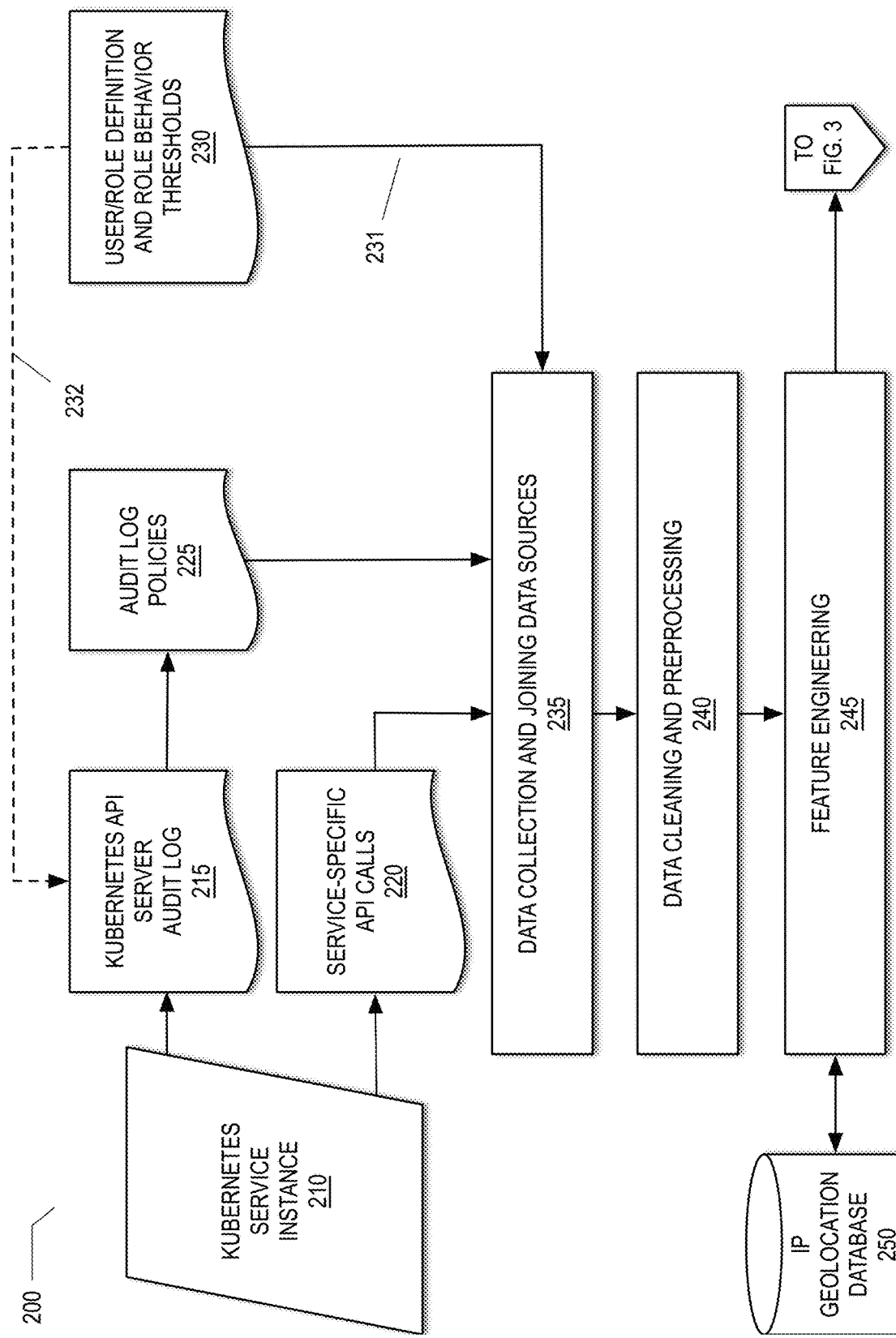
FIG. 2 is a block diagram illustrating functional units that may be involved in performance of a feature extraction stage in accordance with an embodiment of the present disclosure

FIG. 2 is a block diagram illustrating functional units that may be involved in performance of a feature extraction stage 200 in accordance with an embodiment of the present disclosure. The feature extraction stage 200 may be performed by an application (e.g., one of container application(s) 142). During the feature extraction stage 200, features for training an ML model may be extracted from one or more local or remote data sources. Additionally, new features may be derived or otherwise created based on the local or remote data sources or a combination thereof by a feature engineering routine 245.

In the context of the present example, the functional units include a data collection and joining data sources routine 235, a data cleaning and preprocessing routine 240, and a feature engineering routine 245. The data collection and joining data sources routine 235 may be responsible for merging data from multiple local or remote data sources. A data source may be considered local when it is within the same K8s cluster (e.g., K8s cluster 110) or a different K8s cluster within the same K8s ecosystem in which the monitored application exposed by K8 service instance 210 (which may be analogous to service 150) is running A non-limiting example of a local data source is a K8s API server audit log 215, which may be analogous to API audit log 133. As noted above, log data, for example, in the form of audit records, may be recorded to the K8s API server audit log 215 during execution of the K8s service instance 210 responsive to various interactions between various control plane components (e.g., controllers 134, cluster services 136, and scheduler 136) or container application(s) (e.g., container application(s) 142) with a K8s API server (e.g., API server 131) as filtered by audit log policies 225 (which may be analogous to audit log policies 132). The log data may be structured in accordance with a standard file format and data interchange format (e.g., JavaScript Object Notation (JSON)) that uses human-readable text and may include for each logged event, information regarding all or a subset of the following:

Timestamp—a time and date of the request (e.g., the HTTP request).

User—The user string provided during authentication with an authentication layer (e.g., a user interface component of the K8 service instance 210 or other authentication mechanism used by the K8 service instance 210 integrated with the cluster).

Group—The list of group names to which the authenticated user belongs

Extra—A map of arbitrary string keys to string values, provided by the authentication layer.

Source Internet Protocol (IP) address—The IP address from which the request originated.

API—Indicates whether the request is for an API resource.

Request path—The path to the resource (for resource requests) or a miscellaneous non-resource endpoints like/api or/healthz (for non-resource requests).

API request verb—API verbs (e.g., get, list, create, update, patch, watch, delete, and deletecollection) are used for resource requests.

HTTP request verb—Lowercased HTTP methods like get, post, put, and delete are used for non-resource requests.

Resource—The ID or name of the resource that is being accessed (for resource requests).

Subresource—The subresource that is being accessed (for resource requests).

Namespace—The namespace of the object that is being accessed (for namespaced resource requests).

API group—The API group being accessed (for resource requests). An empty string may be used to designate the core API group.

Another non-limiting example of a local data source is service-specific API calls 220 (e.g., recorded by API(s) 143). As described further below, in one embodiment, data collection and joining data sources routine 235 may periodically poll a configurable or predetermined set of service-specific APIs (e.g., API(s) 143) to retrieve information regarding requests made to the set of service-specific APIs, for example, including times, ca A non-limiting example of a remote data source containing metadata that may be merged with (e.g., via path 231) or otherwise injected into (e.g., via path 232) the event data recorded by the K8s API server audit log 215 is user/role definition and role behavior thresholds 230. For instance, assuming the K8s service instance 210 represents a SDS solution available for use by other applications (e.g., other of the container application(s) 142 or other applications running within the same or a different cluster of the K8s ecosystem or another virtualization environment), non-limiting examples of roles may include one or more of: (i) Cloud Infrastructure Architect; (ii) a role that works on feature and product proofs of concepts; (iii) a role that explores use cases for customers; (iv) a role that requires owner/admin privileges; (v) Application/Database Owner; (vi) Storage Administrator; (vii) Kubernetes Administrator. User/role definition and role behavior thresholds 230 may include a mapping between usernames and their respective roles within the K8s service instance 210. The user/role definition and role behavior thresholds 230 may also include for each role a corresponding behavior threshold (e.g., an anomaly threshold indicative of a configured limit on deviation from normal behavior for the role). Depending upon how anomaly scores are represented by the ML algorithm used to perform anomaly detection, for example, normalized between 0 and 1 versus raw population standard deviation values, the anomaly threshold for a given role may be set to a value between 0 and 1, inclusive or to any value greater than or equal to 0, respectively. In this manner, more permissive anomaly thresholds may be established for roles in which the users are expected to be relatively more mobile (e.g., as a result of travel) and/or expected to access the cluster or monitored application outside of normal business hours and less permissive anomaly thresholds may be established for roles in which the users are expected to be relatively less mobile and/or expected to access the cluster or monitored application during normal business hours.

As described further below with reference to FIG. 7, depending upon the particular K8s implementation, there may be multiple mechanisms (e.g., path 232 and/or path 231) through which data may be joined with event data recorded by the K8s API server audit log 215 or otherwise injected into the K8s API server audit log 215.

The data cleaning and preprocessing routine 240 may be responsible for cleaning or otherwise preparing the joined/merged time series data output by the data collection and joining data sources routing 235. For example, if desired, rows of the time series data with missing or null values may be removed or a mean, mode or median of the feature at issue can be used to replace missing values to provide an approximation that can add variance to the dataset. Additionally, textually encoded categorical features (e.g., User, Group, Request path, API request verb, HTTP request verb, Subresource, Namespace, API group, etc.) may be numerically encoded to corresponding values within respective categories as appropriate.

The feature engineering routine 245 may be responsible for creating one or more new features. For example, in the context of the present example, the source IP address within each row or record of the time series data may be used to add information indicative of a particular location from which a request was made or a distance from the cluster (e.g., K8s cluster 110) by requesting the geolocation of the source IP address from an IP geolocation database 250 (e.g., a commercially available geolocation data base, such as Ip2location, MaxMind, Tamo Soft, DB-IP, Ipinfo, IPligence or the like). As described further below with reference to FIG. 6, the feature engineering routing 245 may also create new features based on a count of failed login attempts and/or a count of API requests received over multiple rolling time windows.

The various functional units (e.g., user/role definition and behavior modeling routine 230, data collecting and joining data sources routine 235, the data cleaning and preprocessing routine 240, and the feature engineering routine 245) described with reference to FIG. 2 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, such as the computer system described with reference to FIG. 8 below.

While in the context of the present example, the functional units are shown as being implemented external to the K8s service instance 210, it is to be appreciated in alternative embodiments, some or all of the functional units may be implemented as part of the K8s service instance 210.

Example Continuous Learning and Anomaly Detection Stage

Figure 3:
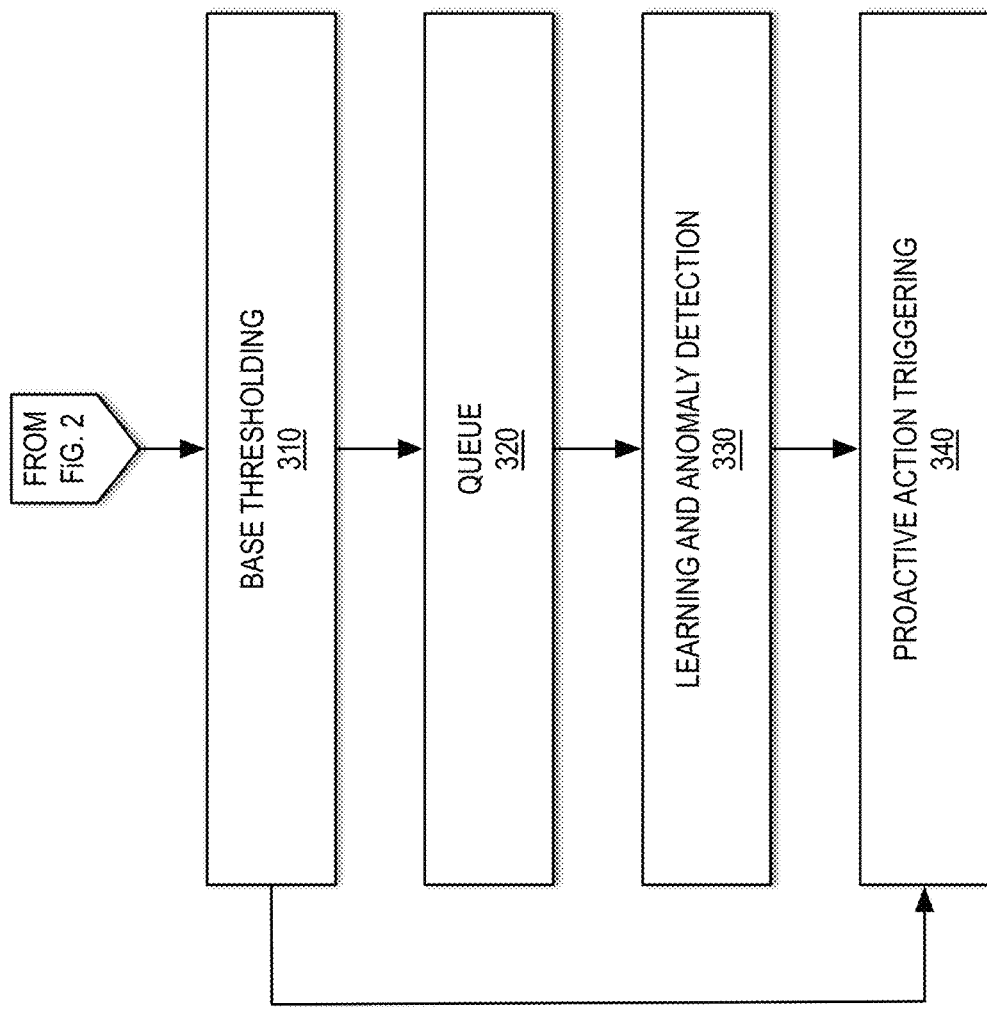
FIG. 3 is a block diagram illustrating functional units that may be involved in performance of a continuous learning and anomaly detection stage in accordance with an embodiment of the present disclosure.

FIG. 3 is a block diagram illustrating functional units that may be involved in performance of a continuous learning and anomaly detection stage 300 in accordance with an embodiment of the present disclosure. Depending upon the particular implementation, the continuous learning and anomaly detection stage 300 may represent a cloud-hosted solution within the same cloud (e.g., cloud 100) and performed by the same application or a different application (e.g., one of container application(s) 142) than the feature extraction stage 300. Alternatively, the continuous learning and anomaly detection stage 300 may represent a cloud-hosted solution within a different cloud or may utilize one of the various cloud ecosystem offerings (e.g., Amazon Kinesis Data Streams, AWS Glue, ASW Lambda, or Amazon SageMaker). Depending upon the particular implementation and the backend utilized (e.g., the logging backend or the webhook backend), the continuous learning and anomaly detection stage 300 may be performed in batches, in near real-time, or in real-time.

In the context of the present example, the functional units include a base thresholding routine 310, a queue module 320, a learning and anomaly detection routine 330, and a proactive action triggering routine 340. The base thresholding routine 310 may be responsible for applying a set of gross or coarse thresholds to the event data regardless of the role of a given user. Such gross or coarse thresholds may represent events so completely out of bounds (e.g., the IP geolocation of the request is 4,000 miles away, the user is operating completely out of bounds for any role, excessive login failures, and/or bad credentials) that learning and anomaly detection routine 330 may be skipped altogether.

The queue module 320 may be responsible for acting as a buffer between a feature extraction stage (e.g., the feature extraction stage 200) and the learning and anomaly detection routine 330. Non-limiting examples of queue module 320 include AWS Kinesis, Apache Kafka, RabbitMQ, and the like. In one embodiment, time series data samples that successfully pass through the base thresholding routine 310 may be posted to the queue module 320, which may and polled by the learning and anomaly detection routine 330.

The learning and anomaly detection routine 330 may be responsible for processing the streaming event data. In order to accommodate evolving data streams, the ML algorithm implemented by the learning and anomaly detection routine 33 should be one that can be dynamically updated to adapt to changes represented within a sliding window of event data as it varies over time. A non-limiting example of such an ML algorithm is random cut forest (RCF), which is described further below with reference to FIGS. 4A and 4B.

The proactive action triggering routine 340 may be responsible for causing appropriate action to be taken on the basis of the output of the learning and anomaly detection routine 330 and the corresponding anomaly thresholds joined with or otherwise injected into the event data stream. As a result of the reduction in false positives achieved by modeling user behavior at the level of granularity of user roles within the monitored application rather than relying on simple static policies, more confidence may be placed in the suspicious activity detection performed by the learning and anomaly detection routine 330, thereby allowing the proactive action triggering routine 340 to more aggressively take proactive action beyond simple alerting and extending to temporary revocation of user permissions to access the cluster and/or the monitored application, logging the user out and prompting the user via an out-of-band communication channel to change their credentials, and/or denying access to various systems and/or components (e.g., blocking API accesses, such as authentication requests and/or data access requests). As described further below with reference to FIG. 7, the proactive action triggering routine 340 may be policy based thereby providing additional flexibility to moderate the impact on non-malicious activities.

The various functional units (e.g., the base thresholding routine 310, the queue module 320, the learning and anomaly detection routine 330, and the proactive action triggering routine 340) described with reference to FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, such as the computer system described with reference to FIG. 8 below.

Example Learning and Anomaly Detection Algorithm

Figure 4A:
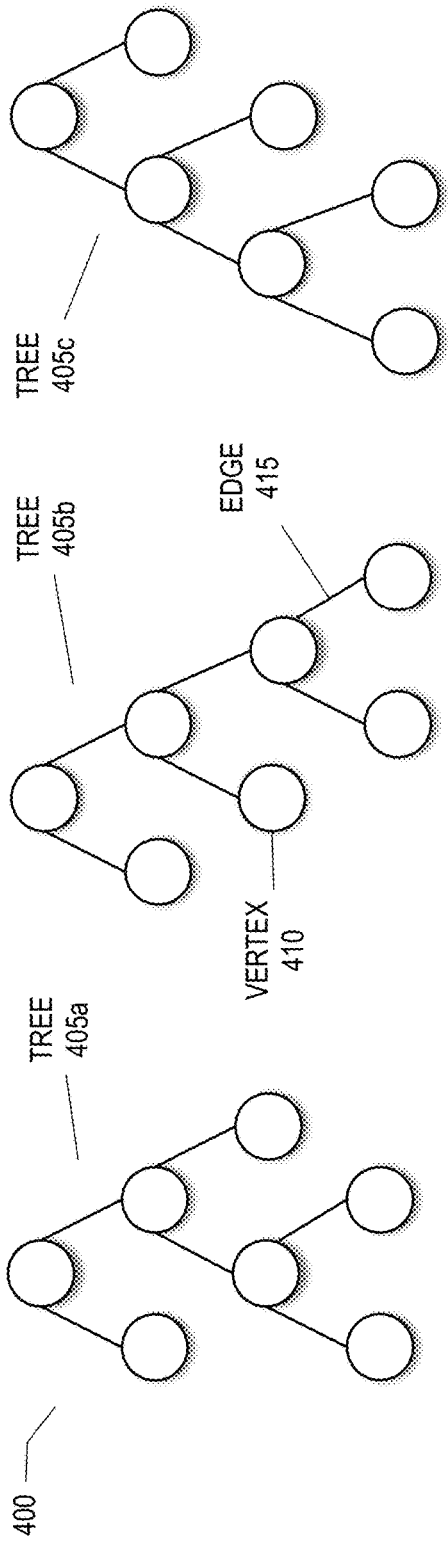
FIG. 4A depicts a set of trees of a forest created during an initial training stage of a random cut forest (RCF) algorithm.

FIG. 4A depicts a set of trees 405a-c of a forest created during an initial training stage of a random cut forest (RCF) algorithm. In one embodiment, the initial training stage may be performed as part of the learning and anomaly detection of block 330 of FIG. 3. There are numerous existing commercial implementations of RCF including the RCF algorithms built into Amazon Kinesis Data Streams, AWS Glue, ASW Lambda, and Amazon SageMaker. It is typically helpful to allow the RCF algorithm to obtain a random sample of training data or if the training data is small enough, the entire training dataset. In the context of examples described herein, before enabling or otherwise relying on anomaly detection by the RCF algorithm, it may be desirable to acquire such a training dataset over a period of time or until a threshold number of audit records have been processed by a feature extraction stage (e.g., the feature extraction stage of FIG. 2) and a continuous learning and anomaly detection stage (e.g., the anomaly detection stage of FIG. 3).

As an unsupervised algorithm, RCF makes use of cluster analysis to detect spikes in time series data, breaks in periodicity or seasonality, and data point exceptions. Random cut forests (e.g., forest 400) can work as a synopsis or sketch of a dynamic data stream (or a time-indexed sequence of numbers). The RCF algorithm takes a random set of data points (e.g., from the training data), cuts them into the same number of points, and creates trees. Each of the trees may represent a specific type of binary space partitioning tree on the samples. In the context of the present example, trees 405a-c represent the forest 400 created as a result of training the RCF algorithm on the random set of data points. In this simplified illustration twenty-one samples have been used to construct three threes. In graph theory, trees (e.g., trees 405a-c) are collections of vertices (e.g., vertex 410) and edges (e.g., edge 415) in which any two vertices are connected by a single edge. While for purposes of illustration, a forest of three trees is shown in which each tree includes seven vertices, it is to be understood the number of trees in the forest and/or the number of vertices is typically a configurable parameter of the RCF algorithm. After the initial training has been completed, forest 400 may be used to represent a "normal" pattern against which subsequent samples (e.g., new data point 455 of FIG. 4B) may be compared (e.g., by inserting them or determining where they would be placed within each tree 405a-c of the forest 400 as described further below with reference to FIG. 4B). Notably, the "normal" pattern may change over time. As data continues to be feed into the model, RCF may keep a rolling pool of data points in memory representing the most recently observed data samples. The size of the pool may be referred to as time decay, which may represent a configurable parameter for the model and which may also be used to determine when a critical mass of data has been accumulated to be confident of what is initially considered "normal"

Figure 4B:
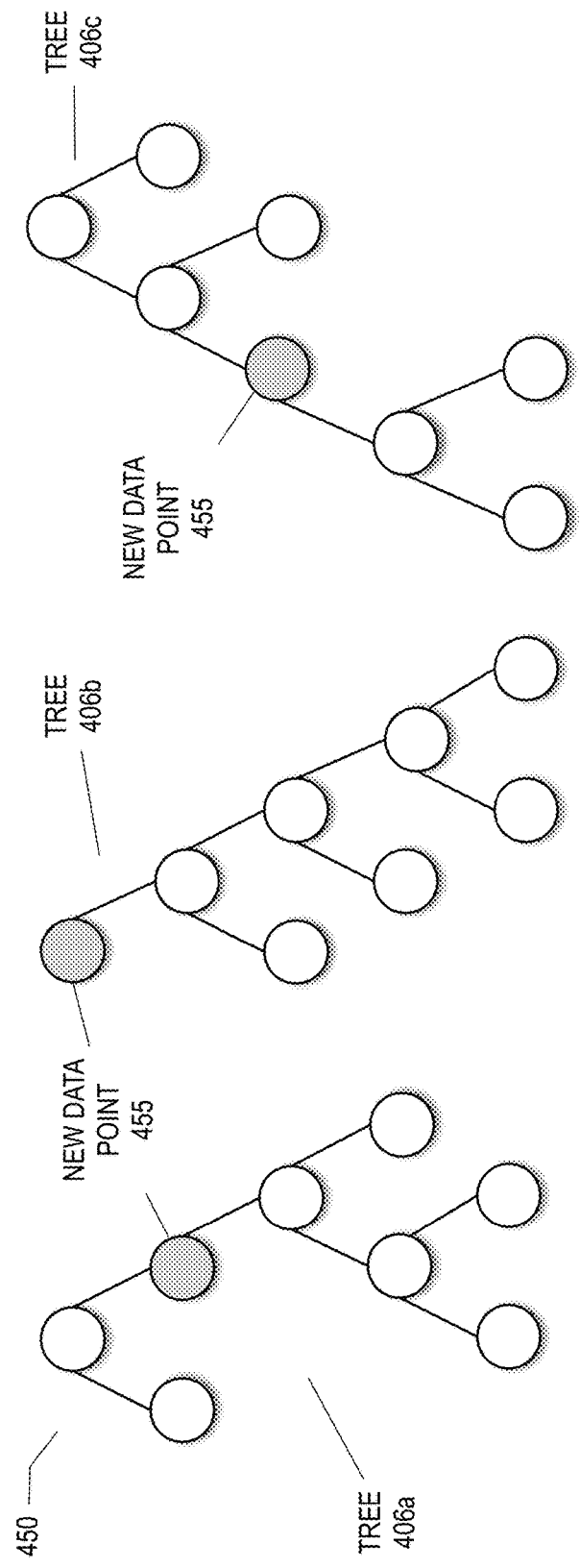
FIG. 4B depicts the set of trees of FIG. 4A after addition of new data point during ongoing learning and anomaly detection of an RCF algorithm.

FIG. 4B depicts the set of trees of FIG. 4A after addition of a new data point 455 during ongoing learning and anomaly detection of an RCF algorithm. RCF distinguishes how new data points (e.g., new data point 455) fits in with or stands out from the current "normal" pattern by monitoring how the new data points change the forest 450, for example, by increasing its complexity in terms of increasing the depth and/or width of one or more of the trees 406a-c beyond any previous constructed tree.

In the context of the present example, forest 450 represents the new set of trees 406a-c corresponding to trees 405a-c of forest 400 after addition of the new data point 455 to trees 405a-c. RCF assigns the new data point 455 an anomaly score. Generally, a lower score is indicative of a lesser deviation from normal by the new data point 455 and a higher score is indicative of a greater deviation from normal. Depending upon the particular RCF implementation, the anomaly score may be normalized to values between 0 and 1, inclusive (in which 0 represents normal, 1 represents abnormal, and the values in between represent various intermediate degrees of deviation from normal, for example, 0.5 may represent a 50% deviation from normal). Alternatively, the anomaly score may represent a population standard deviation value in which a value greater than 3 would represent abnormal. RCF may assign the anomaly score by computing an average score from each constituent tree 406a-c. In one example, the vote or score (e.g., anomaly score) by a particular model (e.g., a particular tree) may be, in approximation, inversely proportional to the resulting depth or level of the vertex in the tree at which the new data point 455 is added, which in effect represents a measure of the density of the region in which the new data point 455 resides. The votes or scores may be scaled with respect to the sample size and may then be aggregated so as to create a more reliable indicator of the degree of deviation from the normal behavior.

In the context of the present example, the new data point 455 would likely be considered moderately anomalous, for example, representing a 50% to 60% deviation from normal, with tree 406b outputting the highest anomaly score, tree 406a outputting the next highest anomaly score, and tree 406c outputting the lowest anomaly score. The more confidence desired by the particular implementation suggests the addition of more trees or larger trees.

While various exampled described herein make reference to RCF, it is to be understood various alternative ML algorithms may be used including but not limited to isolation forest.

Example Audit Log Policy File

FIG. 5 is an example of an audit log policy file 500 in accordance with an embodiment of the present disclosure.

As noted above, in K8s, each request to the K8s API may have a number of associated stages, including a Request-Received stage, a ResponseStarted stage, a ResponseComplete stage, and a Panic stage. The RequestReceived stage is the stage for events generated as soon as the audit handler receives the request, and before it is delegated down the handler chain. The ResponseStarted stage is only generated for long-running requests (e.g., watch) and is generated once the response headers are sent to the requester, but before the response body is sent. The ResponseComplete stage indicates the response body has been completed and no more bytes will be sent. The Panic stage represents events generated when a panic occurred.

In K8s, an audit log policy file (e.g., audit log policy file 500) defines a list of rules (e.g., rules 510-555) specifying what events are to be recorded and what data is to be recorded for such events. Audit log policy file 500 represents a non-limiting example of the format and structure of audit log policies 225 of FIG. 2. Audit log policy file 500 is does not necessarily represent a suggested set of rules for any particular monitored application, but rather is intended to provide a concrete example illustrative of the flexibility provided by the K8s auditing functionality. More or fewer rules, different audit levels, and the like may be appropriate depending on the nature of the monitored application at issue and the events of interest.

In K8s, the fields that define each rule may include:
level: The audit level defining the verbosity of the event.
resources: The object under audit (e.g., "ConfigMaps").
nonResourcesURL: A non-resource Uniform Resource Locator (URL) path that is not associated with any resources.
namespace: Specific objects within a namespace that are under audit.
verb: Specific operation for audit (e.g., create, update, delete)
users: Authenticated user to which the rule applies.
userGroups: Authenticated user group to which the rule applies.
omitStages (e.g., omitStages block 505): Skips generating events on given stages. In the context of the present example, omitStages block 505 prevents requests in the RequestReceived stage from generating audit events.

When an event is processed, it is compared against the list of rules in order. The first matching rule establishes the "audit level" of the event. The audit level defines how much of the event is to be recorded. In K8s, there are four audit levels:
None: Do not log events that match this rule.
Metadata: Logs request metadata (e.g., requesting user, timestamp, resource, verb, etc.) but does not log the request or response bodies.
Request: Log event metadata and request body but not response body. This audit level is inapplicable to non-resource requests.
RequestResponse: Log event metadata, request, and response bodies. This audit level is inapplicable to non-resource requests.

In the context of the present example, the audit log policy file 500 includes ten rules 510-555. Rule 510 logs pod changes at the RequestResponse level. Rule 515 log "pods/log", "pods/status" at the Metadata level. Rule 520 excludes logging requests to a configmap called "controller-config." Rule 525 prevents log watch requests by the "system:kube-proxy" on endpoints or services. The empty group string represents the core API group. Rule 530 logs deployment changes at the RequestResponse level. Rule 535 logs service changes at the Metadata level. Rule 540 logs the request body of configmap changes (changes to the configmap resource) in the kube-system namespace. An empty string (i.e., [""]) may be used to select resources not associated with a namespace. Rule 545 logs configmap and secret changes in all other namespaces at the Metadata level. As above, in rule 540, the empty group string represents the core API group. Rule 550 logs all other resources in the core and extensions API groups at the Request level. For the extensions API group, the version of the group should not be included. Rule 555 represents a wild-card rule that logs all other requests that do not match a preceding rule at the Metadata level; however, long-running requests (e.g., watches) that fall under this wild-card rule will not generate an audit event in the RequestReceived stage.

Example Feature Engineering

Figure 6:
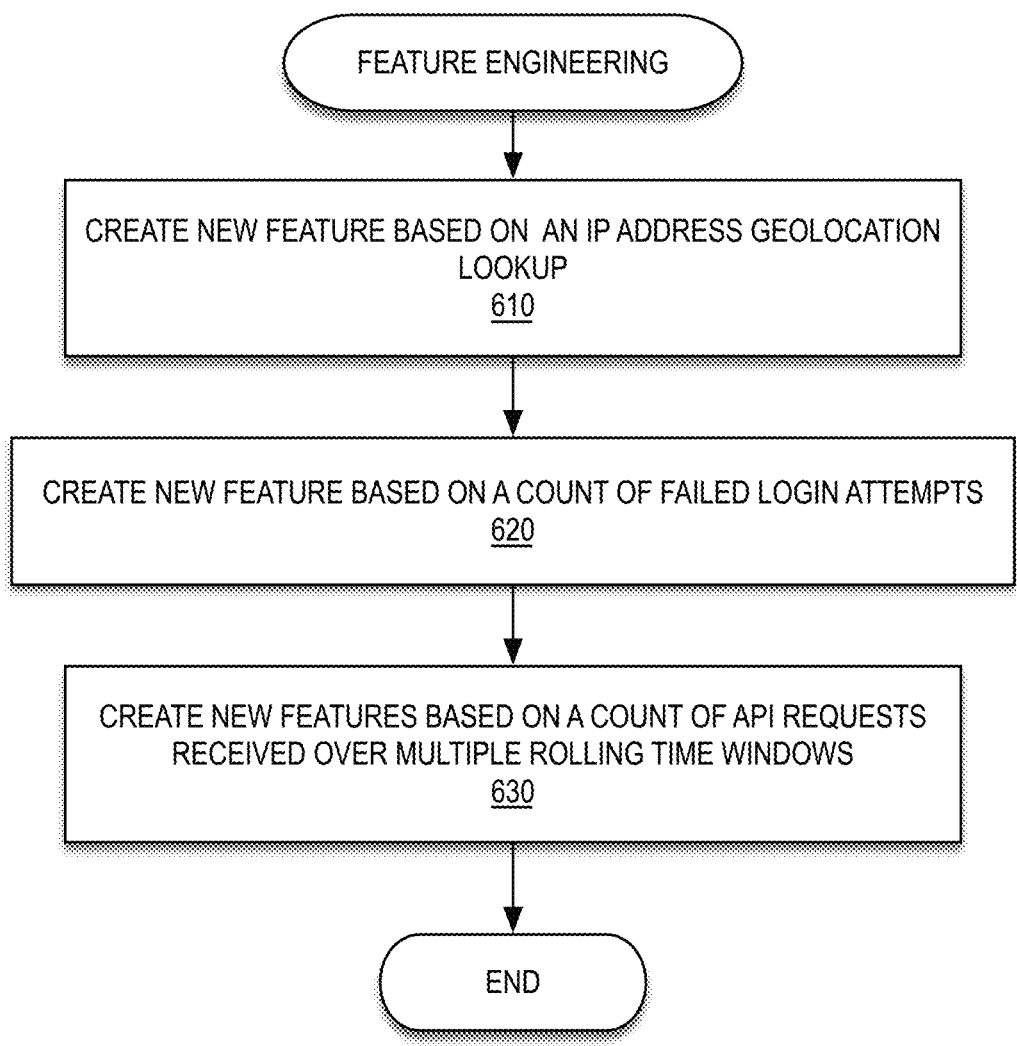
FIG. 6 is a flow diagram illustrating a set of operations for performing feature engineering in accordance with an embodiment of the present disclosure.

FIG. 6 is a flow diagram illustrating a set of operations for performing feature engineering in accordance with an embodiment of the present disclosure. The feature engineering described with reference to FIG. 6 may be performed by a feature engineering routine (e.g., feature engineering routine 245) of an application (e.g., one of container application(s) 142).

At block 610, a new feature may be created based on an IP address geolocation lookup, for example, via an IP geolocation database (e.g., IP geolocation database 250). In one embodiment, rather than simply relying on the country, region, city, ZIP code/postal code, latitude, longitude, latitude, Internet Service Provider (ISP), or domain of the IPS, a distance between the latitude, longitude and the location of the cluster (e.g., cluster 110) may be determined and injected into the event data stream. In this manner, the downstream continuous learning and anomaly detection routine (e.g., continuous learning and anomaly detection routine 330) may learn normal behavior with respect to various rings of distance from the monitored application rather than from specific ISPs or geolocations.

At block 620, one or more new features may be created based on a count of failed login attempts. For example, failed login attempts with the monitored application (e.g., via a user interface component of K8 service instance 210) and/or with the cluster (e.g., K8s cluster 110) by administrative users (e.g., administrative users 101) and/or end users (e.g., users 102) may be aggregated over a predefined or configurable time window and added as metadata to the event data stream.

At block 630, one or more new features may be created based on a count of API requests received over multiple rolling time windows. For example, counts of API requests to the K8 API server, including failed and/or successful requests for each respective component of the cluster may be aggregated within various predefined or configurable windows (e.g., 5 min., 15 min, 30 min, hourly, daily, weekly, etc.). Similar new features may also be created for service-specific APIs (e.g., API(s) 143) that have been configured to capture such information. For example, in one embodiment, data may be collected and joined from the service-specific APIs by the data collection and joining data sources routine 235 periodically polling the service-specific APIs of interest for the metrics of interest (e.g., number of requests received, count of failed requests, count of successful requests, number of distinct users making such requests, etc.).

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

Example Suspicious Activity Detection

Figure 7:
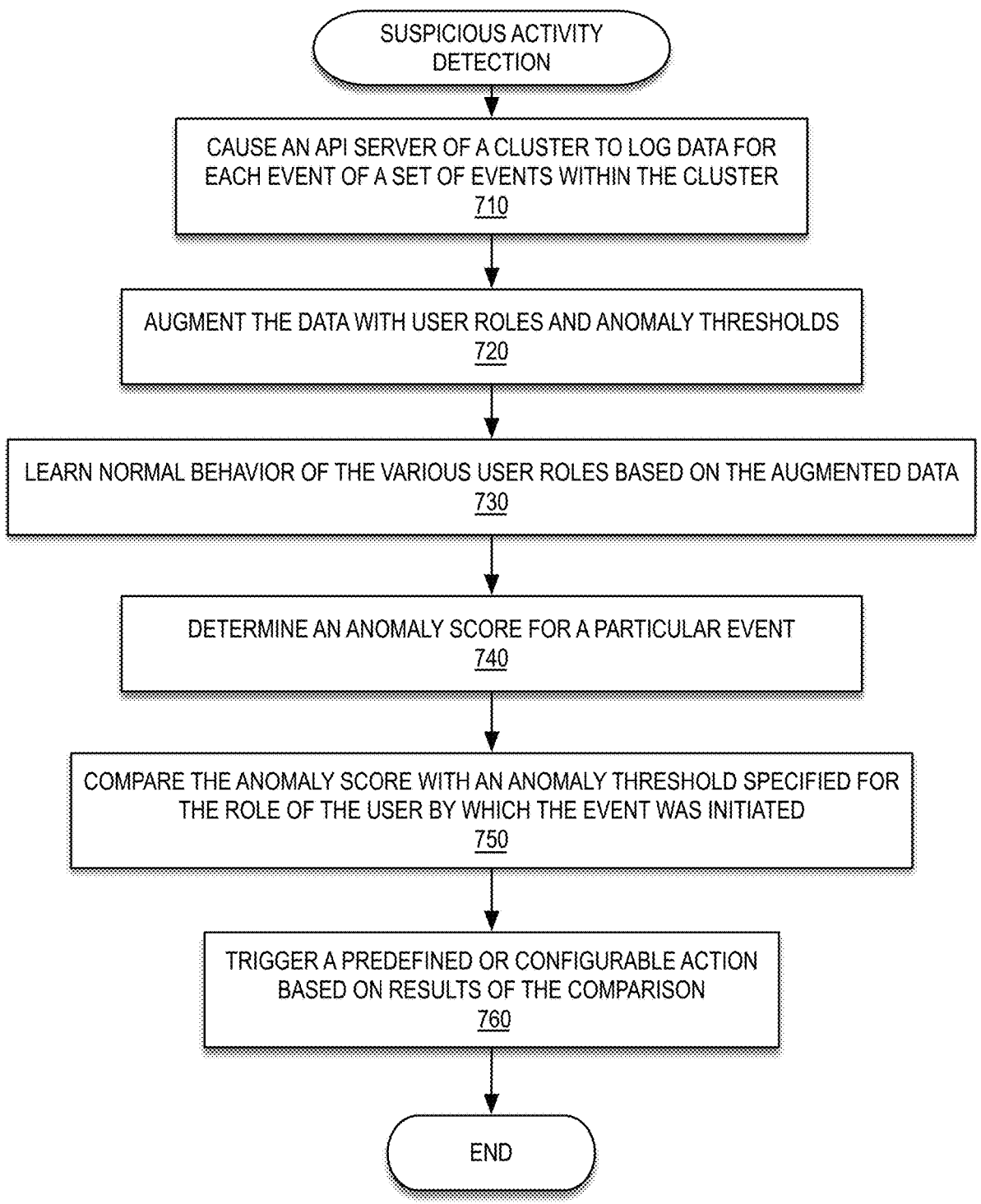
FIG. 7 is a flow diagram illustrating a set of operations for performing suspicious activity detection in accordance with an embodiment of the present disclosure.

FIG. 7 is a flow diagram illustrating a set of operations for performing suspicious activity detection in accordance with an embodiment of the present disclosure. The suspicious activity detection described with reference to FIG. 7 may be provided as an embedded security solution within the monitored application (e.g., K8 service instance 210) or may be performed by a separate application (e.g., one of container application(s) 142).

At block 710, an API server (e.g., API server 131) of a cluster (e.g., K8s cluster 110) of a container orchestration platform is caused to log data for each event of a set of events within the cluster. For example, an administrative user of the cluster may establish an audit log policy file (e.g., audit log policy file 500 containing audit log policies 132 or audit log policies 225) to filter and log various audit events observed within the cluster. Depending upon the auditing backend employed (e.g., a log file or webhooks), the event data may be stored within a file (e.g., API audit log 133 or K8s API server audit log 215) at a specified path or reported via HTTP callbacks. As those skilled in the art will appreciate, the former may be more appropriate for batch processing, whereas the latter may be more useful for online (e.g., near real-time or real-time) anomaly detection. In either case, in K8s, the event data stream of audit events is in the form of time series audit records.

At block 720, the event data stream may be augmented with user roles and anomaly thresholds. Depending upon the particular implementation, there may be multiple available options for combining a separate data source (e.g., user/role definition and behavior thresholds 230) with the event data stream. In one embodiment, as each audit record is processed by a data collection and joining data sources process (e.g., data collection and joining data sources routine 235) the user within the audit record may be used to identify the respective role within the monitored application (e.g., via path 231 of FIG. 2). For example, the respective role may be requested from a user interface component of the monitored application that stores a mapping between users and roles (e.g., user/role definition and role behavior thresholds 230). The user interface component may also concurrently return the corresponding anomaly threshold for the role or may return the corresponding anomaly threshold responsive to a separate call.

According to another embodiment, the augmenting of the event data with user roles and anomaly thresholds may be performed concurrently with the logging of the audit event data to the backend (e.g., via path 232 of FIG. 2). For example, as alluded to above, the K8s implementation may allow an arbitrary dictionary to be added to an authentication response (e.g., via the "extra" field discussed above with reference to FIG. 2). In this manner, as a user is authenticating with the monitored application (e.g., via a user interface component), the authentication response may return one set of key-value pairs (e.g., Role:<user role>) identifying the role of the user and another set of key-value pairs (e.g., AnomalyThreshold:<threshold>) identifying the anomaly threshold for the role. Subsequently, each audit event that is logged may include the user role and anomaly threshold for the associated user.

At block 730, normal behavior may be learned for the various user roles based on the augmented data by feeding the data stream to an ML algorithm (e.g., an RCF algorithm implemented by learning and anomaly detection routine 330).

At block 740, an anomaly score may be determined for a particular event. According to one embodiment, the anomaly score is indicative of a degree of deviation from normal behavior taking into consideration the various features including the role of the user. As noted above, depending upon the particular ML algorithm, the anomaly score may be normalized or may represent a raw population standard deviation value.

At block 750, the anomaly score determined at block 740 may be compared with the anomaly threshold specified for the role of the user by which the event was initiated. The comparison may produce a binary result indicating whether the anomaly score was found to be greater than the anomaly threshold or may provide information indicative of the different between the anomaly score and the anomaly threshold.

At block 760, a predefined or configurable action may be triggered based on the result of the comparison performed at block 750. In one embodiment, the predefined or configurable action may include one or more of alerting an administrative user of the cluster or the monitored application, temporarily revoking permissions of the user to access the cluster or the monitored application, and/or logging the user out of the cluster or the monitored application and prompting the user to change their user credentials via an out-of-band communication channel (e.g., via short message service (SMS) or via an authentication application associated with the monitored application). In implementations in which online (e.g., near real-time or real-time) suspicious activity detection is being performed, the predefined or configurable action may be taken prior to allowing the request with which the particular event is associated to proceed. For example, the audit log backend may be configured for operation in a batch mode or a blocking mode and in the blocking mode, the anomalous nature of individual audit events may be evaluated during the Request-Received stage described above with reference to FIG. 5. Alternatively or additionally, the predefined or configurable action may affect future interactions by the user with the cluster and/or the monitored application.

In one embodiment, the nature of the audit event at issue may be taken into consideration as part of a flexible policy-based approach. For example, the trigged actions may be subject to tuning via a set of policies employed by the proactive action triggering routine 340. As a non-limiting example, if all other indications are that the user at issue is operating completely within bounds, but the user is accessing the cluster or the monitored application from Costa Rica, rather than locking the user out of the cluster or the monitored application, instead an alert may be generated. Other examples might include a relatively high volume of API calls to an "unusual" API method (e.g., a user/role is using a lot of PUT methods when their role is more defined to be read specific) or a relatively large number of unsuccessful authentication attempts. In one embodiment, a policy may be represented to capture the method calls and the response codes; and downstream, these items could, for example, be aggregated into new features (e.g., number of PUT methods performed or "not authorized" responses logged either over a defined time period or as a percentage of actions) to represent an outline for current behavior. For example, such new features may be created by a feature engineering routine (e.g., feature engineering routine 245).

While in the context of the present example, a number of enumerated blocks are included, it is to be understood that examples may include additional blocks before, after, and/or in between the enumerated blocks. For example, feature engineering may be performed prior to block 730. Similarly, in some examples, one or more of the enumerated blocks may be omitted and/or performed in a different order.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by functional units (e.g., modules, procedures, functions, routines, subroutines, or subparts of a computer program product), for example, those described above with reference to FIGS. 2 and 3.

Figure 8:
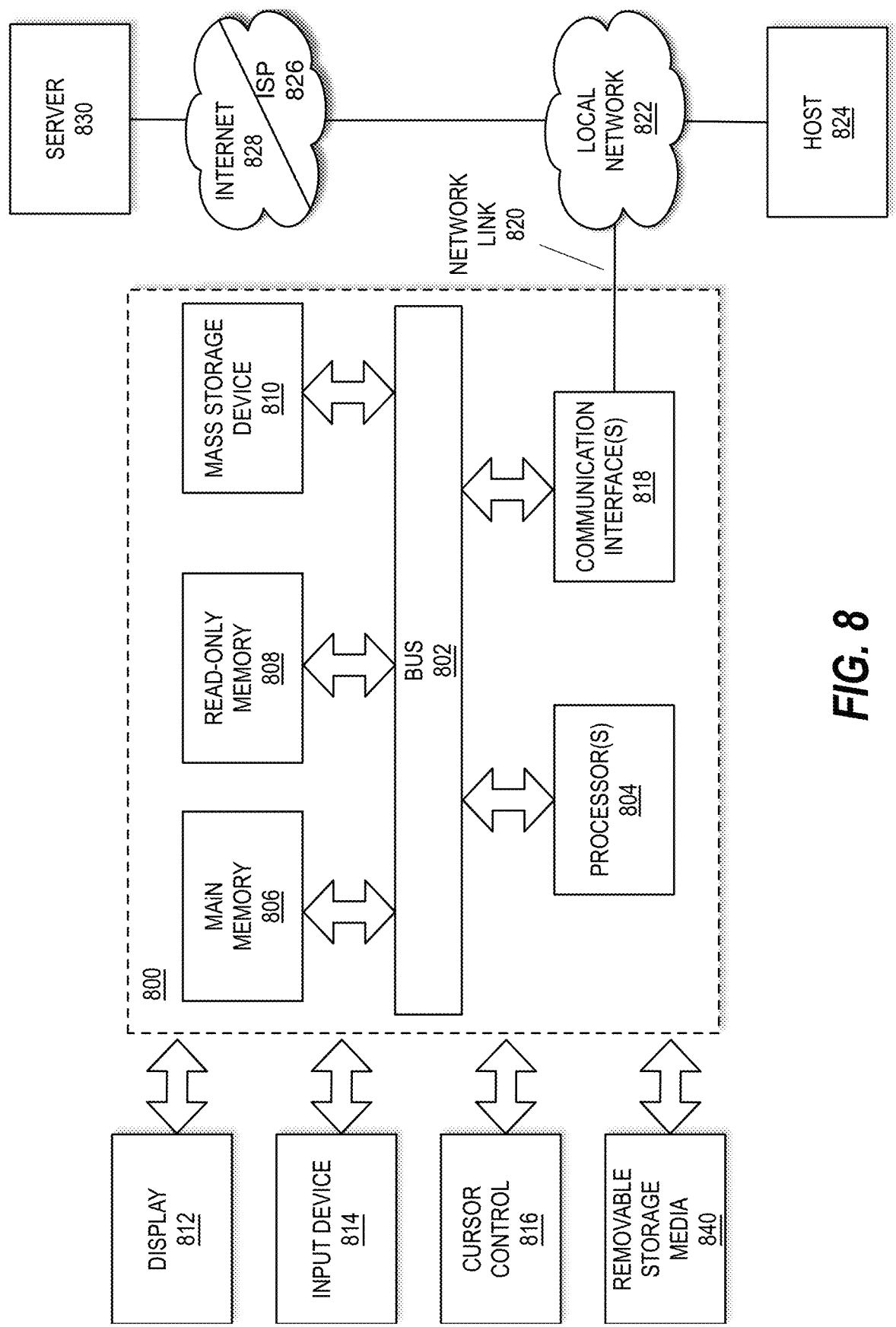
FIG. 8 illustrates an example computer system in which or with which embodiments of the present disclosure may be utilized.

FIG. 8 is a block diagram that illustrates a computer system 800 in which or with which an embodiment of the present disclosure may be implemented. Computer system 800 may be representative of all or a portion of the computing resources of a node (e.g., nodes 140a-n) of a cluster (e.g., K8s cluster 110) of a container orchestration platform. Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., a hardware processor 804) coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine readable medium storing instructions, which when executed by one or more processing resources of a cluster of a container orchestration platform, cause an application running within the cluster to:
    extract data logged by an application programming interface (API) server of the cluster of the container orchestration platform for each event of a set of events within the cluster, wherein the data includes information regarding a request made to an API exposed by the API server with which the event is associated and a user of a plurality of users associated with the application by which the event was initiated;
    combine the data with another data source including, for each API call to an API of the application, information regarding a path of the API call and a user of the plurality of users by which the API call was initiated;
    augment the combined data with information indicative of a role of a plurality of user roles associated with the user and an anomaly threshold specified for the role;
    learn, by a machine-learning (ML) algorithm, normal behavior of respective roles of the plurality of user roles by processing the augmented data;
    responsive to processing of the augmented data for a particular event of the set of events, determine, by the ML algorithm, an anomaly score, indicative of a degree of deviation from the normal behavior of the role, associated with the particular event; and
    based on a comparison between the anomaly score and the anomaly threshold specified for the role, trigger a predefined or configurable action.

2. The non-transitory machine readable medium of claim 1, wherein the data further includes a source Internet Protocol (IP) address from which the event was initiated and wherein the combined data or augmented data is further augmented with information indicative of a distance of the source IP address from the cluster.

3. The non-transitory machine readable medium of claim 1, wherein the data is logged within an audit log of the API server and wherein the set of events are specified by a set of audit log policies.

4. The non-transitory machine readable medium of claim 1, wherein the predefined or configurable action comprises one or more of:
- alerting an administrative user of the cluster or the application;
- temporarily revoking permissions of the user to access the cluster or the application;
- logging the user out of the cluster or the application and prompting the user to change their user credentials via an out-of-band communication channel; and
- denying a particular interaction of the user with the cluster or the application.

5. The non-transitory machine readable medium of claim 4, wherein the predefined or configurable action is taken prior to allowing the request with which the particular event is associated to proceed.

6. The non-transitory machine readable medium of claim 1, wherein the ML algorithm comprises Random Cut Forest.

7. The non-transitory machine readable medium of claim 1, wherein the instructions further cause the application to create additional derived features within the augmented data for processing by the ML algorithm, including a count of requests received by the API server over a plurality of rolling time windows.

8. The non-transitory machine readable medium of claim 1, wherein the ML algorithm is implemented by a microservice associated with the application.

9. The non-transitory machine readable medium of claim 1, wherein the ML algorithm is implemented external to the application.

10. The non-transitory machine readable medium of claim 1, wherein the data is augmented with the information indicative of the role and the anomaly threshold during logging of the data for each event based on key-value pairs returned as part of an authentication response.

11. A method comprising:
- causing an application programming interface (API) server of a cluster of a container orchestration platform to log data for each event of a set of events within the cluster, wherein the data includes information regarding a request made to an API exposed by the API server with which the event is associated and a user of a plurality of users associated with an application running within the cluster by which the event was initiated;
- combining the data with another data source including, for each API call to an API of the application, information regarding a path of the API call and a user of the plurality of users by which the API call was initiated;
- augmenting the combined data with information indicative of a role of a plurality of user roles associated with the user and an anomaly threshold specified for the role;
- learning, by a machine-learning (ML) algorithm, normal behavior of respective roles of the plurality of user roles by processing the augmented data;
- responsive to processing of the augmented data for a particular event of the set of events, determining, by the ML algorithm, an anomaly score, indicative of a degree of deviation from the normal behavior of the role, associated with the particular event; and
- based on a comparison between the anomaly score and the anomaly threshold specified for the role, triggering a predefined or configurable action.

12. The method of claim 11, wherein the data further includes a source Internet Protocol (IP) address from which the event was initiated and wherein the combined data or augmented data is further augmented with information indicative of a distance of the source IP address from the cluster.

13. The method of claim 11, wherein the predefined or configurable action comprises one or more of:
- alerting an administrative user of the cluster or the application;
- temporarily revoking permissions of the user to access the cluster or the application;
- logging the user out of the cluster or the application and prompting the user to change their user credentials via an out-of-band communication channel; and
- denying a particular interaction of the user with the cluster or the application.

14. The method of claim 13, wherein the predefined or configurable action is taken prior to allowing the request with which the particular event is associated to proceed.

15. A system comprising:
- one or more processing resources; and
- a non-transitory computer-readable medium, coupled to the processing resource, having stored therein instructions that when executed by the one or more processing resources cause an application running within a cluster of a container orchestration platform hosted by the system to:
- extract data logged by an application programming interface (API) server of the cluster for each event of a set of events within the cluster, wherein the data includes information regarding a request made to an API exposed by the API server with which the event is associated and a user of a plurality of users associated with the application by which the event was initiated;
- combine the data with another data source including, information regarding a path of an API call made to an API of the application and a user of the plurality of users associated with the API call;
- augment the combined data with information indicative of a role of a plurality of user roles associated with the user and an anomaly threshold specified for the role;
- learn, by a machine-learning (ML) algorithm, normal behavior of respective roles of the plurality of user roles by processing the augmented data;
- responsive to processing of the augmented data for a particular event of the set of events, determine, by the ML algorithm, an anomaly score, indicative of a degree of deviation from the normal behavior of the role, associated with the particular event; and
- based on a comparison between the anomaly score and the anomaly threshold specified for the role, trigger a predefined or configurable action.

16. The system of claim 15, wherein the data further includes a source Internet Protocol (IP) address from which the event was initiated and wherein the combined data or augmented data is further augmented with information indicative of a distance of the source IP address from the cluster.

17. The system of claim 15, wherein the predefined or configurable action comprises one or more of:
- alerting an administrative user of the cluster or the application;
- temporarily revoking permissions of the user to access the cluster or the application;
- logging the user out of the cluster or the application and prompting the user to change their user credentials via an out-of-band communication channel; and
- denying a particular interaction of the user with the cluster or the application.

18. The system of claim 15, wherein the instructions further cause the application to create additional derived features within the augmented data for processing by the ML algorithm, including a count of requests received by the API server over a plurality of rolling time windows.

19. The system of claim 15, wherein the ML algorithm is implemented by a microservice associated with the application.

20. The system of claim 15, wherein the ML algorithm is implemented external to the application.

* * * * *